Dec. 4, 1934.   O. C. ROESEN   1,982,756
MATRIX ROASTER
Original Filed Sept. 2, 1926
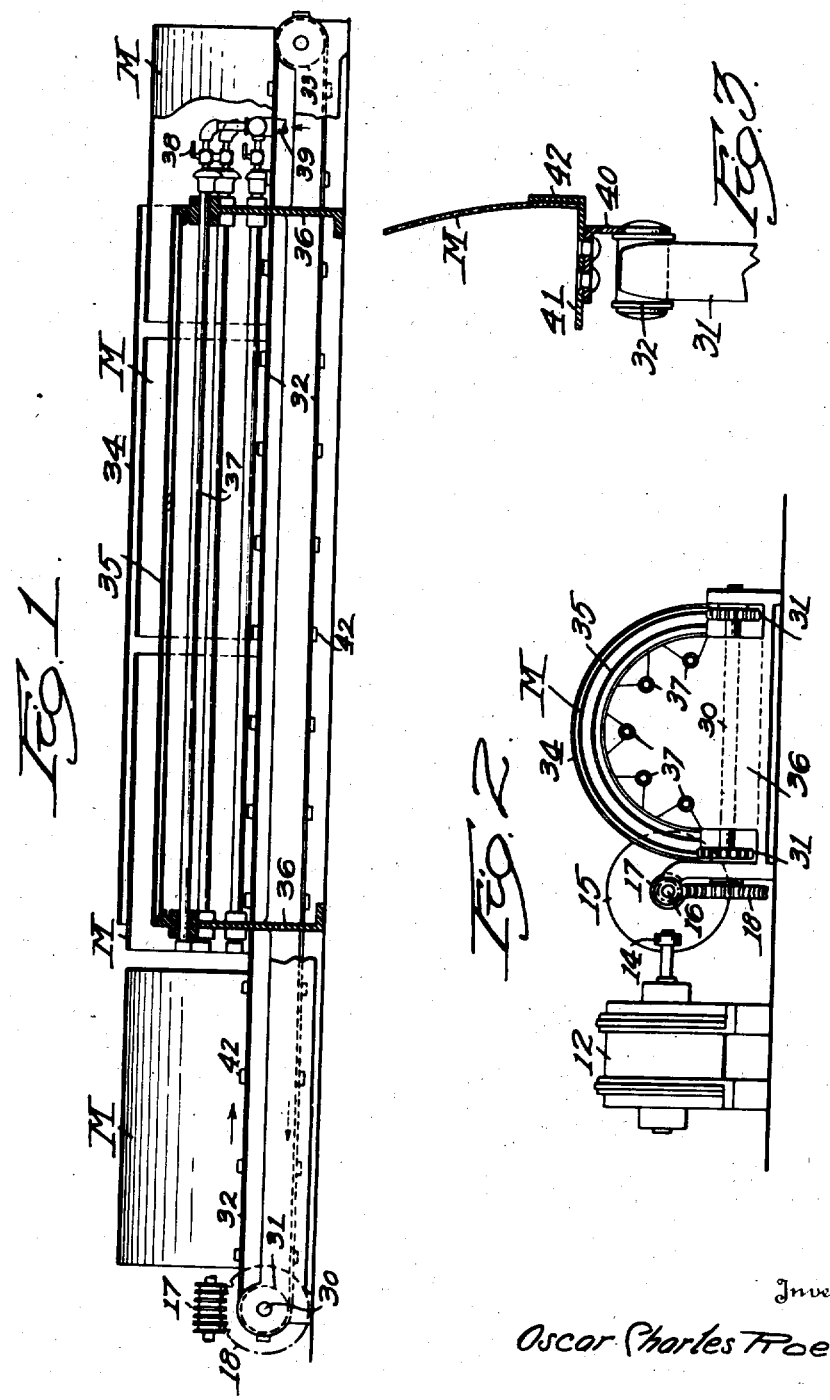
Inventor
Oscar Charles Roesen.
By Southgate Fay & Hardy
Attorney Patented Dec. 4, 1934

1,982,756

UNITED STATES PATENT OFFICE 1,982,756

MATRIX ROASTER

Oscar Charles Roesen, Brooklyn, N. Y., assignor to Wood Newspaper Machinery Corporation, New York, N. Y., a corporation of New York Original application September 2, 1926, Serial No. 133,161. Divided and this application October 2, 1930, Serial No. 485,913

3 Claims. (Cl. 34—12)

This is a division of my Patent No. 1,843,489 dated February 2, 1932 on an application, Serial No. 133,161, filed September 2, 1926.

This invention relates to a device for roasting stereotype printing plate matrices. The principal objects of the invention are to provide a machine which can operate continuously and in which the matrices can be introduced at one point and withdrawn at another, fully and uniformly dried and roasted; to provide a construction in which the speed of operation can be varied to subject the matrices to the heat longer or shorter periods of time as may be found necessary, and to provide a construction in which introduction and withdrawal of the matrices is a simple and convenient matter.

Other objects and advantages of the invention will appear hereinafter.

Reference is to be had to the accompanying drawing in which

Fig. 1 is a side view, partly in section, of a matrix roaster embodying this invention;

Fig. 2 is an end view thereof, and

Fig. 3 is an enlarged sectional view.

The devices which have been used heretofore for roasting stereotype matrices have been of the type to operate by hand to roast the matrices individually, with no means for accomplishing any of the above mentioned results. The matrix is left in as long as the operator may judge necessary and the result is a wide range in the amount of moisture left in the matrix after roasting. Also the work is done very slowly and one of the operators has to attend to each matrix individually and has to wait for one to be entirely dried before starting another.

In order to avoid the delay and uncertainty, and to accomplish the results above mentioned, I provide a roaster in which the matrices are placed on a chain conveyor to secure continuous action. The means for operation is shown as comprising a motor 12 having a driving wheel 14 which can be adjusted longitudinally along a driven disc 15, the surface of which it engages. Obviously the speed of rotation of the disc is controlled by the position of the wheel 14 and the speed of the machine is easily controlled. This wheel 15 is mounted on a shaft 16 which, by a worm 17, drives a worm wheel 18. The wheel 18 is on a shaft 30 carrying two sprocket wheels 31 which drive two endless chains 32 or belts. The chains are carried at the other end by two other wheels 33. The chains are at opposite sides of the machine just as far apart as the edges of a curved matrix M.

The conveyor formed by these two chains passes through an oven formed by a casing 34 having a semicircular form. Inside this casing is an inner curved double wall 35 supported by end walls 36. These end walls support stationary steam or hot water pipes 37 controlled individually by ordinary valves 38 and fed from a supply pipe 39. By means of these valves the proper degree of heat is regulated.

The chains are provided, at intervals, with brackets 40 carrying matrix rests 41 having upturned curved flanges 42. These flanges are just far enough apart to receive the edges of a matrix after it is bent to the proper curvature. They are curved to that radius so as to hold the matrices at just the right curvature.

The chains, or conveyor, extend beyond the oven at the loading end far enough to permit the operator to bend a matrix and apply it to the rests in the position shown at the left in Fig. 1. Then the continuously moving conveyor carries the matrix through the oven at a speed regulated to secure the proper period of roasting. They pass through one after another as indicated and are discharged at the other end from which they can be removed by hand.

It will be obvious that the speed of rotation having been fixed by proper adjustment of the wheel 14, rotation will be constant. Thus each matrix will be in the roaster the same length of time and thus be subjected to the same amount of heat.

In this way the roasting is uniform. A few matrices can be tested to see if they are dry enough and then the adjustment made to secure the desired results. In this way a uniform product can be secured and one operator can handle as many matrices as a large number could under the old conditions. Also only one machine is required occupying only very little space to do the work of a large number of the old form of matrix roasters.

The results above mentioned are thus obtained. The matrices cannot get out of shape and they are roasted uniformly.

Although I have illustrated and described only one form of the invention, I am aware of the fact that modifications can be made therein by any person skilled in the art without departing from the scope of the invention as expressed in the claims. Therefore, I do not wish to be limited to all the details of construction herein shown and described, but what I do claim is:—

1. In a flexible matrix roaster, the combination with a curved roasting oven and means for supplying it with heat, of a conveyor for the matrices having a series of rests oppositely located and curved for holding the opposite ends of the matrices so that the matrices will be held in curved condition with their centers out of contact with the elements of the conveyor to allow free circulation of heated air against their concave surfaces.

2. In a matrix roaster, the combination with a semicircular oven, open at the ends, of an endless conveyor passing through the oven and comprising two chains movable together and having opposite vertical rests for the edges of the matrices to hold them in a flexed shape similar to that of the oven.

3. In a matrix roaster, the combination with an oven of a general semicylindrical cross section, and a flat conveyor for matrices arranged to move through the bottom of the oven along the flat side thereof, said conveyor having upwardly turned flanges at its edge against which the surfaces of the matrices rest flatwise to hold the matrix in a flexed semicylindrical shape.

OSCAR CHARLES ROESEN.

CERTIFICATE OF CORRECTION.

Patent No. 1,982,756.  December 4, 1934.

OSCAR CHARLES ROESEN.

It is hereby certified that the State of Incorporation of the assignee in the above numbered patent was erroneously written and printed as "New York" whereas said State of Incorporation should have been written and printed as Virginia, as shown by the records of assignments in this office; and that the said Letters Patent should be read with this correction therein that the same may conform to the record of the case in the Patent Office.

Signed and sealed this 12th day of February, A. D. 1935.

(Seal)

Leslie Frazer
Acting Commissioner of Patents.

1. In a flexible matrix roaster, the combination with a curved roasting oven and means for supplying it with heat, of a conveyor for the matrices having a series of rests oppositely located and curved for holding the opposite ends of the matrices so that the matrices will be held in curved condition with their centers out of contact with the elements of the conveyor to allow free circulation of heated air against their concave surfaces.

2. In a matrix roaster, the combination with a semicircular oven, open at the ends, of an endless conveyor passing through the oven and comprising two chains movable together and having opposite vertical rests for the edges of the matrices to hold them in a flexed shape similar to that of the oven.

3. In a matrix roaster, the combination with an oven of a general semicylindrical cross section, and a flat conveyor for matrices arranged to move through the bottom of the oven along the flat side thereof, said conveyor having upwardly turned flanges at its edge against which the surfaces of the matrices rest flatwise to hold the matrix in a flexed semicylindrical shape.

OSCAR CHARLES ROESEN.

CERTIFICATE OF CORRECTION.

Patent No. 1,982,756. December 4, 1934.

OSCAR CHARLES ROESEN.

It is hereby certified that the State of Incorporation of the assignee in the above numbered patent was erroneously written and printed as "New York" whereas said State of Incorporation should have been written and printed as Virginia, as shown by the records of assignments in this office; and that the said Letters Patent should be read with this correction therein that the same may conform to the record of the case in the Patent Office.

Signed and sealed this 12th day of February, A. D. 1935.

(Seal)

Leslie Frazer
Acting Commissioner of Patents.